United States Patent
Lu et al.

(10) Patent No.: US 10,244,475 B2
(45) Date of Patent: Mar. 26, 2019

(54) METHOD AND NETWORK NODE FOR FACILITATING SYNCHRONIZATION IN NETWORK

(71) Applicant: Telefonaktiebolaget LM Ericsson (publ), Stockholm (SE)

(72) Inventors: Qianxi Lu, Beijing (CN); Qingyu Miao, Beijing (CN); Jonas Kronander, Knivsta (SE); Robert Baldemair, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 21 days.

(21) Appl. No.: 15/514,661

(22) PCT Filed: Sep. 28, 2014

(86) PCT No.: PCT/CN2014/087685
§ 371 (c)(1),
(2) Date: Mar. 27, 2017

(87) PCT Pub. No.: WO2016/045123
PCT Pub. Date: Mar. 31, 2016

(65) Prior Publication Data
US 2017/0238251 A1    Aug. 17, 2017

(51) Int. Cl.
*H04W 52/02* (2009.01)
*H04W 56/00* (2009.01)
*H04W 4/06* (2009.01)

(52) U.S. Cl.
CPC ......... *H04W 52/0216* (2013.01); *H04W 4/06* (2013.01); *H04W 56/002* (2013.01); *Y02D 70/1262* (2018.01); *Y02D 70/164* (2018.01)

(58) Field of Classification Search
CPC ........... H04W 56/001; H04W 52/0216; H04W 8/005; H04W 74/0891; H04W 1/1678;
(Continued)

(56) References Cited

U.S. PATENT DOCUMENTS 9,763,189 B2 * 9/2017 Ang ................. H04W 52/0216
2009/0016320 A1 * 1/2009 Li ..................... H04W 56/0015
370/350

(Continued)

FOREIGN PATENT DOCUMENTS

| EP | 2068523 A1 | 6/2009 |
|---|---|---|
| WO | 2012048729 A1 | 4/2012 |
| WO | 2013036873 A2 | 3/2013 |

OTHER PUBLICATIONS

3GPP, "3rd Generation Partnership Project; Technical Specification Group Radio Access Network; Evolved Universal Terrestrial Radio Access (E-ULTRA); TDD Home eNode B (HeNB) Radio Frequency (RF) requirements analysis (Release 11)", 3GPP TR 36.922 V11.0.0, Sep. 2012, 1-74.

(Continued)

*Primary Examiner* — Jung Liu
(74) *Attorney, Agent, or Firm* — Sage Patent Group

(57) ABSTRACT

The present disclosure provides a method (400) for facilitating synchronization in a network. The method (400) comprises, at a network node: receiving (S410) synchronization signals from one or more neighboring network nodes; determining (S420) whether the one or more neighboring network nodes have reached a synchronized state based on the synchronization signals; determining (S430) whether a difference between a current synchronization value of the network node and an average of synchronization values of the one or more neighboring network nodes exceeds a threshold; and obtaining (S440) an updated synchronization value of the network node based on the synchronization values of the one or more neighboring network nodes, regardless of the current synchronization value, when it is (Continued)

determined that the one or more neighboring network nodes have reached the synchronized state and the difference exceeds the threshold.

20 Claims, 7 Drawing Sheets

(58) Field of Classification Search
CPC .............. H04W 84/18; H04W 56/0015; H04W 56/002; H04W 92/10; H04W 92/18; Y02D 70/00; Y02D 70/164; Y02D 70/142; Y02D 70/22
See application file for complete search history.

(56) References Cited

U.S. PATENT DOCUMENTS

| | | | |
|---|---|---|---|
| 2009/0016321 A1* | 1/2009 | Li | H04W 56/0015 370/350 |
| 2009/0017851 A1* | 1/2009 | Li | H04W 56/002 455/502 |
| 2010/0226359 A1 | 9/2010 | van der Wateren et al. | |
| 2013/0039359 A1* | 2/2013 | Bedrosian | H04J 3/0667 370/350 |
| 2013/0132502 A1* | 5/2013 | Stacey | H04W 56/0015 709/208 |
| 2014/0119357 A1* | 5/2014 | Abraham | H04W 56/001 370/338 |
| 2014/0211781 A1 | 7/2014 | Kim et al. | |
| 2015/0327201 A1* | 11/2015 | He | H04W 48/16 370/336 |

OTHER PUBLICATIONS

3GPP, "3rd Generation Partnership Project; Technical Specification Group Radio Access Network; Study on LTE Device to Device Proximity Services; Radio Aspects (Release 12)", 3GPP TR 36.843 V12.0.1, Mar. 2014, 1-50.

Simeone, Osvaldo et al., "Distributed Synchronization in Wireless Networks", IEEE Signal Processing Magazine, Sep. 2008, 81-97.

Unknown, Author, "Inter eNB over-the-air communication (OTAC) for LTE-Advanced", Nokia Siemens Networks, Nokia, 3GPP TSG RAN WG1 #57 Meeting, R1-091777, San Francisco, USA, May 4-8, 2009, 1-6.

* cited by examiner

METHOD AND NETWORK NODE FOR FACILITATING SYNCHRONIZATION IN NETWORK

TECHNICAL FIELD

The disclosure relates to communication technology, and more particularly, to a method and a network node for facilitating synchronization in a network.

BACKGROUND

The ultimate goal of mobile broadband is ubiquitous and sustainable provision of unlimited data rates to anyone or anything at anytime. Ultra Dense Network (UDN) is a promising next step to the successful introduction of Long Term Evolution (LTE) for wide area and local area accesses. The UDN can be deployed in areas with high traffic consumptions and thus provide an evolution towards the above goal. Due to overprovision of access nodes and thus low average load in the access network, the UDN creates ubiquitous access opportunities for providing users with desired data rates even under realistic assumption on user density and traffic.

The overprovision is achieved by an extremely dense grid of access nodes. Inter-access-node distances in the order of tens of meters or below are envisioned. In in-door deployments, one or more access nodes are possible in each room. In addition to increased network capacity, densification (via reduced transmit powers) also enables access to vast spectrums in millimeter-wave bands and thus increased data rates.

As the very first step of communication, synchronization is critical to the UDN. Here "synchronization" includes time-domain synchronization and/or frequency-domain synchronization. Compared with access link synchronization between an Access Node (AN, e.g., an evolved NodeB (eNB)) and a User Equipment (UE), it is more challenging to achieve backhaul link synchronization between ANs, which is necessary in the time domain for avoiding collisions between uplink and downlink (when Time Division Duplex (TDD) is applied) and achieving intelligent inter-cell interference coordination (e.g., enhanced Inter-Cell Interference Cooperation (eICIC)) and/or in the frequency domain for reducing handover latency and complexity in frequency error estimation. In traditional cellular networks, the backhaul link synchronization is achieved via wired connections, including e.g., packet based synchronization (Network Time Protocol (NTP) or Precision Time Protocol (PTP) (IEEE1588)) or Global Navigation Satellite System (GNSS) based synchronization (Global Positioning System (GPS) or Galileo). However, these solutions are not applicable in the UDN where ANs are deployed in an in-door scenario with wireless backhaul links.

*Distributed Synchronization in Wireless Networks*, IEEE Sig. Proc Magazine, 2008, discloses a solution for distributed synchronization in a wireless network. FIG. 1 shows a scenario where this solution is applied. As shown, each node broadcasts synchronization signals to all of its neighboring nodes and each node updates its local synchronization value based on synchronization signals received from all of its neighboring nodes. It is to be noted that the term "synchronization" as used herein refers to time-domain synchronization, frequency-domain synchronization, or both. Accordingly, "synchronization value" as used herein refers to time-domain synchronization value, frequency-domain synchronization value, or both. This solution requires a number of iterations before the synchronization values of the nodes converge (i.e., the nodes reach a synchronized state).

According to this distributed synchronization solution, at a node i, the synchronization value of a node j is estimated, e.g., by utilizing a non-coherent detection algorithm, e.g., Maximum Likelihood (ML) algorithm or Minimum Mean Square Error (MMSE) algorithm. The estimated synchronization value of the node j is represented here as $\hat{s}_j$, which may include a frequency-domain synchronization value $\hat{\alpha}_j$ and/or a time-domain synchronization value $\hat{\beta}_j$.

Then, the node i updates its local synchronization value according to the following iteration equation:

$$s_i(n+1) = \frac{s_i(n) + \sum_{j=1}^{M} \hat{s}_j(n)}{M+1} \quad (1)$$

where n is the iteration index, $s_i$ is the synchronization value of the node i and M is the number of neighboring nodes.

Equivalently, Equation (1) can be rewritten as:

$$\alpha_i(n+1) = \frac{\alpha_i(n) + \sum_{j=1}^{M} \hat{\alpha}_j(n)}{M+1} \quad \text{and/or} \quad (2)$$

$$\beta_i(n+1) = \frac{\beta_i(n) + \sum_{j=1}^{M} \hat{\beta}_j(n)}{M+1} \quad (3)$$

where $\alpha_i$ and $\beta_i$ denote the frequency-domain and time-domain synchronization values of the node i, respectively.

The node i transmits synchronization signals to its neighboring nodes periodically.

FIG. 2 shows a simulation result of an iterative process for time-domain synchronization values of nodes in a network. In this simulation, it is assumed that there are 11*11=121 nodes distributed over a square area and the initial time-domain synchronization values of these nodes are randomly distributed within a range of one symbol length (2.778 μs). The horizontal axis of FIG. 2 represents the number of iterations and the vertical axis of FIG. 2 represents average error of the time-domain synchronization values of the nodes in Cyclic Prefix (CP) lengths (1 CP length=347 ns). The network can be considered to reach a synchronized state when the average error is smaller than 1 CP length. It can be seen from FIG. 2 that, after 6 iterations, the average error becomes about 0.8 CP lengths and the network can be considered as synchronized.

However, the distributed synchronization solution suffers from a "new arrival" problem. For example, when a new node arrives (e.g., a new node is powered on or activated) after all the nodes in the network have reached the synchronized state, the arrival of the new node may have significant impact on the synchronization in the network. FIG. 3 shows a simulation result explaining the "new arrival" problem. The horizontal axis of FIG. 3 represents the number of iterations and the vertical axis of FIG. 3 represents average error of the time-domain synchronization values of the nodes in Ts (sampling period, 1 Ts=0.4518 ns). In this simulation, a new node arrives at the 50-th iteration and cause a significant fluctuation in the average error. It can be seen from FIG. 3 that the network is re-synchronized at the 52-th iteration when the average error becomes 358.8

Ts≈0.4671 CP lengths. The "new arrival" problem also exists in frequency-domain synchronization, for which detail descriptions will be omitted here.

In addition, it is generally desired to reach such synchronized state as soon as possible. In order to accelerate the iterative process, each node shall transmit its synchronization signals at a relatively short period, which, however, is disadvantageous from the perspective of power consumption.

There is thus a need for an improved solution for distributed synchronization.

SUMMARY

It is an object of the present disclosure to provide a method and a network node for facilitating synchronization in a network, capable of solving at least one of the above problems.

In a first aspect, a method for facilitating synchronization in a network is provided. The method comprises, at a network node: receiving synchronization signals from one or more neighboring network nodes; determining whether the one or more neighboring network nodes have reached a synchronized state based on the synchronization signals; determining whether a difference between a current synchronization value of the network node and an average of synchronization values of the one or more neighboring network nodes exceeds a threshold, the synchronization values being estimated based on the synchronization signals; and obtaining an updated synchronization value of the network node based on the synchronization values of the one or more neighboring network nodes, regardless of the current synchronization value, when it is determined that the one or more neighboring network nodes have reached the synchronized state and the difference exceeds the threshold.

In an embodiment, the method further comprises: refraining from transmitting any synchronization signal when it is determined that the one or more neighboring network nodes have reached the synchronized state and the difference exceeds the threshold.

In a second aspect, a method for facilitating synchronization in a network is provided. The method comprises, at a network node: receiving synchronization signals from one or more neighboring network nodes; determining whether the one or more neighboring network nodes have reached a synchronized state based on the synchronization signals; determining whether a difference between a current synchronization value of the network node and an average of synchronization values of the one or more neighboring network nodes exceeds a threshold, the synchronization values being estimated based on the synchronization signals; setting a transmission period at which the network node transmits synchronization signals to a first period when it is determined that the one or more neighboring network nodes have not reached the synchronized state; and setting the transmission period at which the network node transmits synchronization signals to a second period longer than the first period when it is determined that the one or more neighboring network nodes have reached the synchronized state and that the difference does not exceed the threshold.

In a third aspect, a method for facilitating synchronization in a network is provided. The method comprises, at a network node: receiving synchronization signals from one or more neighboring network nodes; determining whether a difference between a current synchronization value of the network node and an average of synchronization values of the one or more neighboring network nodes exceeds a threshold, the synchronization values being estimated based on the synchronization signals; determining whether the one or more neighboring network nodes have reached a synchronized state based on the synchronization signals; setting the transmission period at which the network node transmits synchronization signals to a second period when it is determined that the difference does not exceed the threshold; and setting a transmission period at which the network node transmits synchronization signals to a first period shorter than the second period when it is determined that the difference exceeds the threshold and that the one or more neighboring network nodes have not reached the synchronized state.

In an embodiment according to the second or third aspect, the method further comprises: obtaining an updated synchronization value of the network node based on the synchronization values of the one or more neighboring network nodes, regardless of the current synchronization value, when it is determined that the one or more neighboring network nodes have reached the synchronized state and the difference exceeds the threshold.

In an embodiment according to the second or third aspect, the method further comprises: indicating the transmission period, or change thereof, to the one or more neighboring network nodes.

In an embodiment according to the second or third aspect, the transmission period, or change thereof, is indicated by: broadcasting a message indicating the transmission period, or change thereof, to the one or more neighboring network nodes; including in each transmitted synchronization signal an information element indicating the transmission period, or change thereof, or transmitting a synchronization signal in a predefined format associated with the transmission period.

In an embodiment according to the second or third aspect, it is determined whether the one or more neighboring network nodes have reached the synchronized state by: determining a period at which each of the one or more neighboring network nodes transmits the synchronization signals.

In an embodiment according to the first, second or third aspect, it is determined whether the one or more neighboring network nodes have reached the synchronized state by: determining a deviation of each of the synchronization values of the one or more neighboring network nodes from the average.

In an embodiment according to the first, second or third aspect, it is determined whether the one or more neighboring network nodes have reached the synchronized state by: determining a variation of each of the synchronization values of the one or more neighboring network nodes over time.

In an embodiment according to the first, second or third aspect, each synchronization value comprises a time-domain synchronization value or a frequency-domain synchronization value.

In an embodiment according to the first, second or third aspect, each synchronization value comprises a time-domain synchronization value and a frequency-domain synchronization value. It is determined that the one or more neighboring network nodes have reached the synchronized state when the one or more neighboring network nodes have reached the synchronized state in both time domain and frequency domain. The threshold comprises a time-domain threshold and a frequency-domain threshold. It is determined that the difference exceeds the threshold when a difference between the current time-domain synchronization value of the network node and an average of the time-domain synchronization values of the one or more neighboring network nodes exceeds the time-domain threshold, a difference between the current frequency-domain synchronization value of the network node and an average of the frequency-domain synchronization values of the one or more neighboring network nodes exceeds the frequency-domain threshold, or both.

In an embodiment according to the first, second or third aspect, the network node is a base station.

In a fourth aspect, a network node for facilitating synchronization in a network is provided. The network node comprises: a receiving unit for receiving synchronization signals from one or more neighboring network nodes; a first determining unit for determining whether the one or more neighboring network nodes have reached a synchronized state based on the synchronization signals; a second determining unit for determining whether a difference between a current synchronization value of the network node and an average of synchronization values of the one or more neighboring network nodes exceeds a threshold, the synchronization values being estimated based on the synchronization signals; and an obtaining unit for obtaining an updated synchronization value of the network node based on the synchronization values of the one or more neighboring network nodes, regardless of the current synchronization value, when it is determined by the first determining unit that the one or more neighboring network nodes have reached the synchronized state and it is determined by the second determining unit that the difference exceeds the threshold.

In a fifth aspect, a network node for facilitating synchronization in a network is provided. The network node comprises: a receiving unit for receiving synchronization signals from one or more neighboring network nodes; a first determining unit for determining whether the one or more neighboring network nodes have reached a synchronized state based on the synchronization signals; a second determining unit for determining whether a difference between a current synchronization value of the network node and an average of synchronization values of the one or more neighboring network nodes exceeds a threshold, the synchronization values being estimated based on the synchronization signals; and a setting unit for: setting a transmission period at which the network node transmits synchronization signals to a first period when it is determined by the first determining unit that the one or more neighboring network nodes have not reached the synchronized state; setting the transmission period at which the network node transmits synchronization signals to a second period longer than the first period when it is determined by the first determining unit that the one or more neighboring network nodes have reached the synchronized state and it is determined by the second determining unit that the difference does not exceed the threshold.

In a sixth aspect, a network node for facilitating synchronization in a network is provided. The network node comprises: a receiving unit for receiving synchronization signals from one or more neighboring network nodes; a first determining unit for determining whether the one or more neighboring network nodes have reached a synchronized state based on the synchronization signals; a second determining unit for determining whether a difference between a current synchronization value of the network node and an average of synchronization values of the one or more neighboring network nodes exceeds a threshold, the synchronization values being estimated based on the synchronization signals; and a setting unit for: setting the transmission period at which the network node transmits synchronization signals to a second period when it is determined by the second determining unit that the difference does not exceed the threshold; and setting a transmission period at which the network node transmits synchronization signals to a first period shorter than the second period when it is determined by the second determining unit that the difference exceeds the threshold and it is determined by the first determining unit that the one or more neighboring network nodes have not reached the synchronized state.

The above embodiments of the first, second and third aspects are also applicable for the fourth, fifth and sixth aspects, respectively.

With the embodiments of the present disclosure, at a network node, it is determined whether one or more neighboring network nodes have reached a synchronized state and whether a difference between a current synchronization value of the network node and an average of synchronization values of the one or more neighboring network nodes exceeds a threshold. Then, based on the results of these determinations, the synchronization value of the network node can be updated, and/or the transmission period at which the network node transmits synchronization signals can be set. In this way, the "new arrival" problem as discussed above can be avoided. Further, the transmission period can be set adaptively based on the synchronization state in the network. Accordingly, the transmission period can be set to a relatively short period when it is desired to accelerate the synchronization in the network, and to a relatively long period when it is desired to save power consumption at the network node.

BRIEF DESCRIPTION OF THE DRAWINGS

The above and other objects, features and advantages will be more apparent from the following description of embodiments with reference to the figures, in which.

DETAILED DESCRIPTION

The embodiments of the disclosure will be detailed below with reference to the drawings. It should be noted that the following embodiments are illustrative only, rather than limiting the scope of the disclosure.

Figure 1:
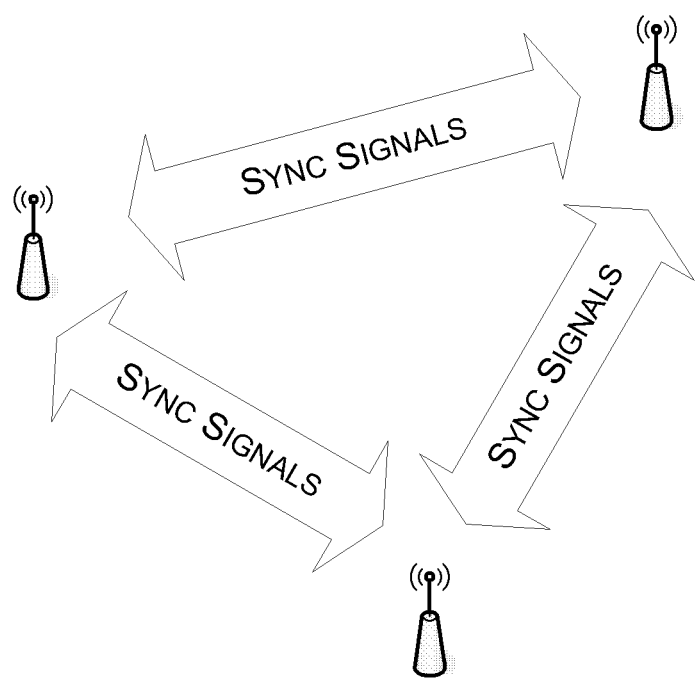
FIG. 1 is a schematic diagram showing a scenario of distributed synchronization.
Figure 2:
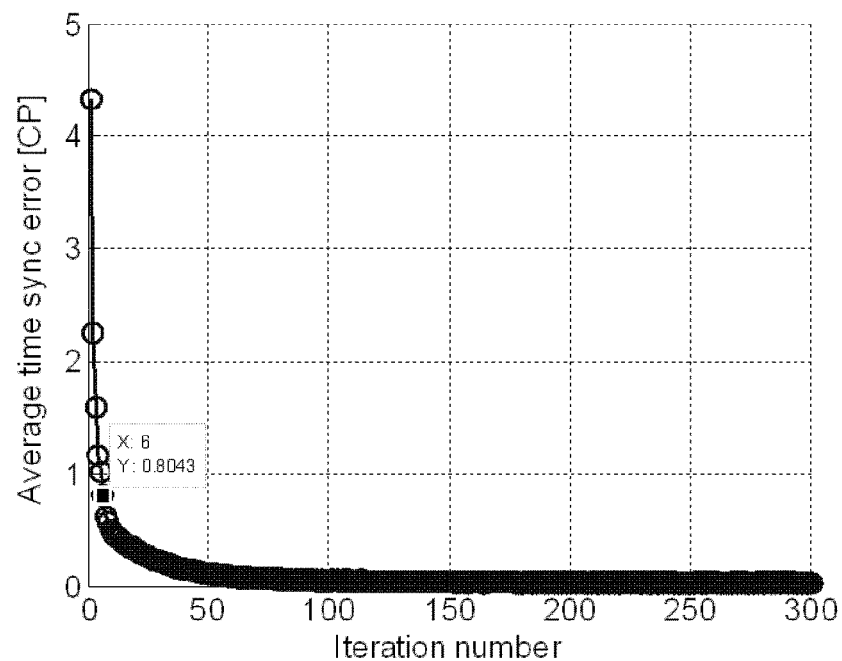
FIG. 2 is a schematic diagram showing a simulation result of an iterative process for time-domain synchronization values of nodes in a network.
Figure 3:
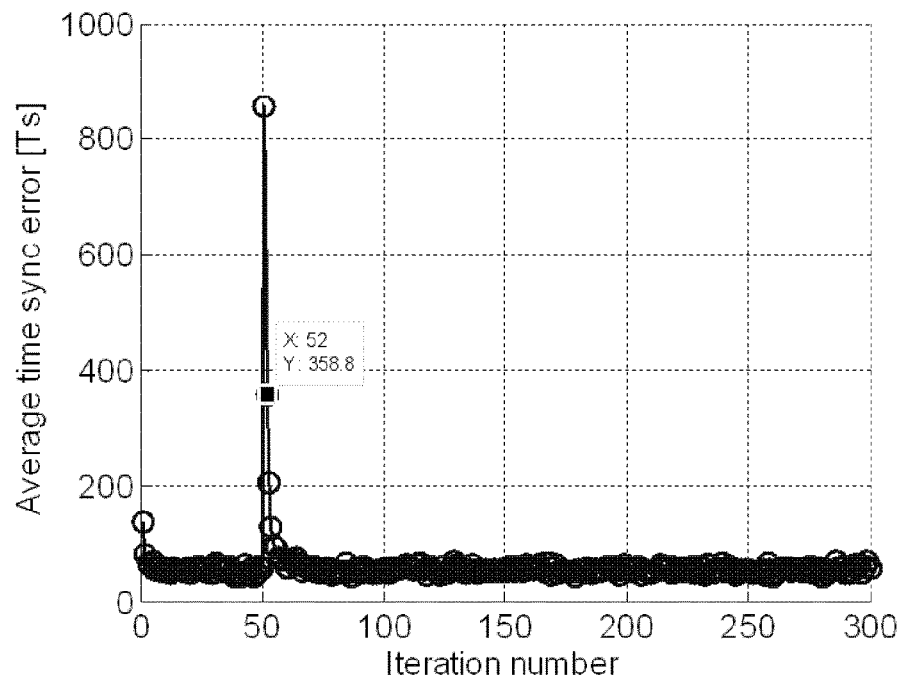
FIG. 3 is a schematic diagram showing a simulation result explaining the "new arrival" problem.
Figure 4:
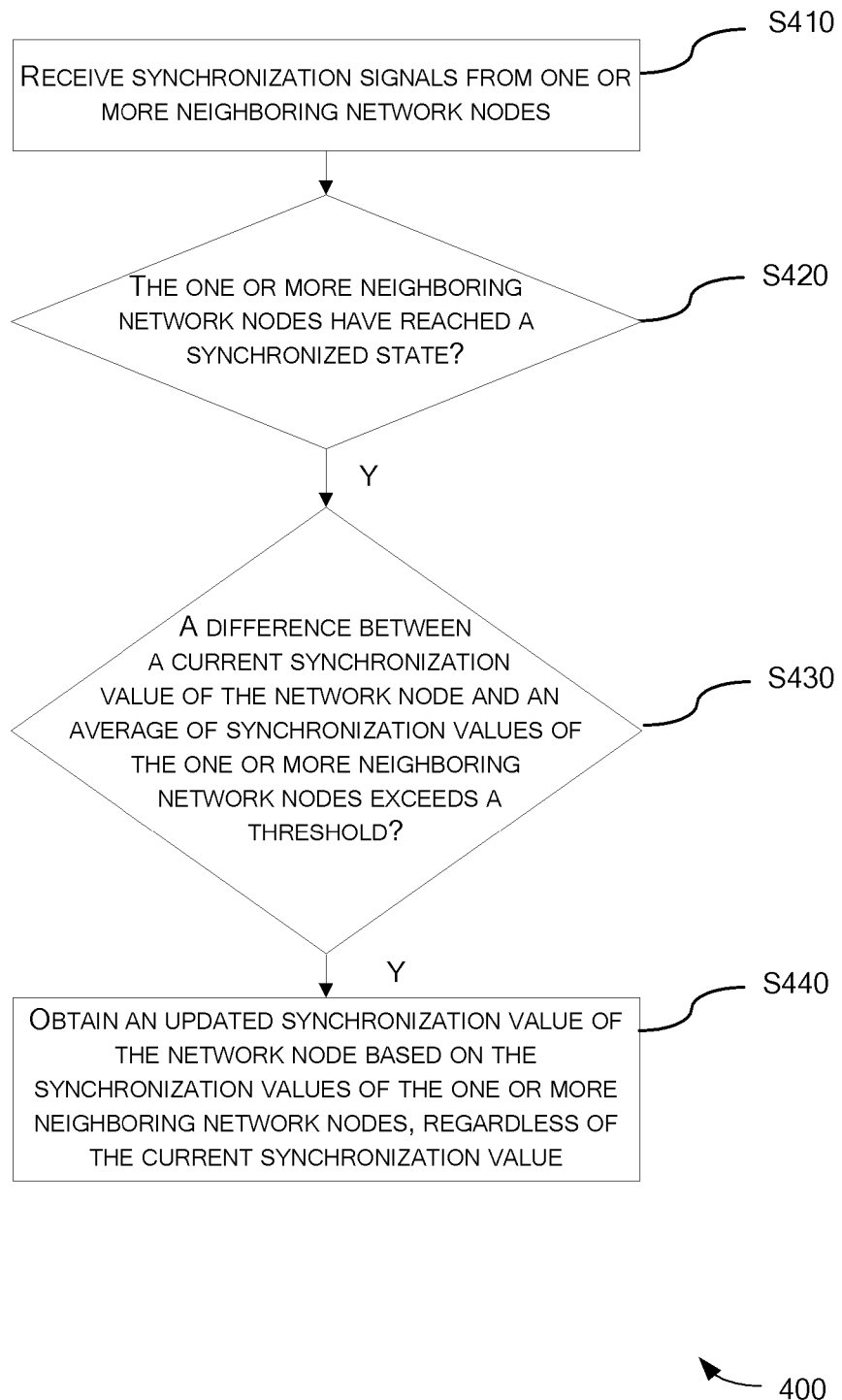
FIG. 4 is a flowchart illustrating a method for facilitating synchronization in a network according to a first embodiment of the present disclosure.

FIG. 4 is a flowchart illustrating a method 400 for facilitating synchronization in a network according to a first embodiment of the present disclosure. The method 400 can be applied in a UDN consisting of a number of network nodes (e.g., eNBs) and can be performed at a network node (e.g., eNB). It is to be noted here that the application of the method 400 is not limited to the UDN or any specific network or network topology. Rather, it can be applied to any network where synchronization among network nodes is performed in a distributed manner.

The method 400 includes the following steps.

At step S410, synchronization signals are received from one or more neighboring network nodes.

At step S420, it is determined whether the one or more neighboring network nodes have reached a synchronized state based on the synchronization signals.

Here, the synchronization value of each neighboring network node can be estimated based on the received synchronization signals by utilizing ML or MMSE algorithm, as described above.

According to an embodiment, the determination in the step S420 can be made by determining a deviation of each of the synchronization values of the one or more neighboring network nodes from an average of the synchronization values of the one or more neighboring network nodes (referred to as "average synchronization value" hereinafter). For example, it can be determined that the one or more neighboring network nodes have reached the synchronized state if the deviation of each of the synchronization values from the average synchronization value is smaller than a predefined amount. Otherwise, it can be determined that the one or more neighboring network nodes have not reached the synchronized state. As another example, the deviation can be measured by means of variance. In this case, the variance of the synchronization values of the one or more neighboring network nodes can be calculated. Then, it can be determined that the one or more neighboring network nodes have reached the synchronized state if the variance is smaller than a predefined value. Otherwise, it can be determined that the one or more neighboring network nodes have not reached the synchronized state.

Alternatively, the determination in the step S420 can be made by determining a variation of each of the synchronization values of the one or more neighboring network nodes over time. For example, assuming that the current iteration index is k, the variation of the synchronization value of the neighboring network node j can be calculated as:

$$\Delta_j(k) = \hat{s}_j(k) - \hat{s}_j(k-1) \quad (4)$$

where $\Delta_j(k)$ denotes the variation, $\hat{s}_j(k)$ denotes the current estimated synchronization value of the node j and $\hat{s}_j(k-1)$ denotes the previous estimated synchronization value of the node j. This is particularly advantageous when there is only one neighboring network node, in which case the variation reflects the synchronization state in the network more accurately than the average synchronization value.

It is to be noted here that Equation (4) is illustrative only. For example, it can be appreciated by those skilled in the art that more historical values $\hat{s}_j$ of can be considered in calculating the variation.

At step S430, it is determined whether a difference between a current synchronization value of the network node and the average synchronization value exceeds a threshold.

It is to be noted here that the step S430 can be performed independently from the step S420. That is, the steps S420 and S430 are not necessarily to be performed in the order shown in FIG. 4 and the step S430 can be performed before the step S420.

At step S440, when it is determined at the step S420 that the one or more neighboring network nodes have reached the synchronized state and at the step S430 that the difference exceeds the threshold, the an updated synchronization value of the network node is obtained based on the synchronization values of the one or more neighboring network nodes, regardless of the current synchronization value.

That is, in the step S440, the synchronization value of the network node is updated according to:

$$s_i(n+1) = \frac{\sum_{j=1}^{M} \hat{s}_j(n)}{M} \quad (5)$$

or equivalently:

$$\alpha_i(n+1) = \frac{\sum_{j=1}^{M} \hat{\alpha}_j(n)}{M} \text{ and/or} \quad (6)$$

$$\beta_i(n+1) = \frac{\sum_{j=1}^{M} \hat{\beta}_j(n)}{M}. \quad (7)$$

It can be seen from Equations (5)-(7) that once it is determined that the synchronization value of the network node need to be updated, the updated synchronization value is based only on the synchronization values of the one or more neighboring network nodes, regardless of its current synchronization value. When it is determined at the step S420 that the one or more neighboring network nodes have reached the synchronized state and at the step S430 that the difference exceeds the threshold, it can be assumed that the current synchronization value of the network node deviates largely from the synchronization value(s) of its neighboring node(s) which has(have) reached the synchronized state, e.g., because the network node is newly powered on or activated. In this case, instead of updating its synchronization value to approach the average synchronization value through a number of iterations, the network node can set its synchronization value directly to the average synchronization value. In this way, the synchronization of the network node with the neighboring node(s) in the network can be significantly accelerated.

Additionally, according to an embodiment, when it is determined at the step S420 that the one or more neighboring network nodes have reached the synchronized state and at the step S430 that the difference exceeds the threshold, the network node refrains from transmitting any synchronization signal. In an example, the network node may set a period at which it transmit synchronization signals to a sufficiently long period. The idea behind this is that, since the current synchronization value of the network node deviates largely from the synchronization value(s) of its neighboring node(s) which has(have) reached the synchronized state, any synchronization signal transmitted by the network based on its current synchronization value might compromise the synchronized state in the network. On the other hand, since in the step S440 the updated synchronization value of the network node is derived from the synchronization value(s) of its neighboring network node(s), there is no need for the network node to notify its updated synchronization value to its neighboring network node(s). After the synchronization value of the network node has been updated, the transmission period of the synchronization signal can be shortened.

On the other hand, when it is determined at the step S420 that the one or more neighboring network nodes have not reached the synchronized state or at the step S430 that the difference does not exceed the threshold, the network node may update its synchronization value according to Equations (1)-(3).

Figure 5:
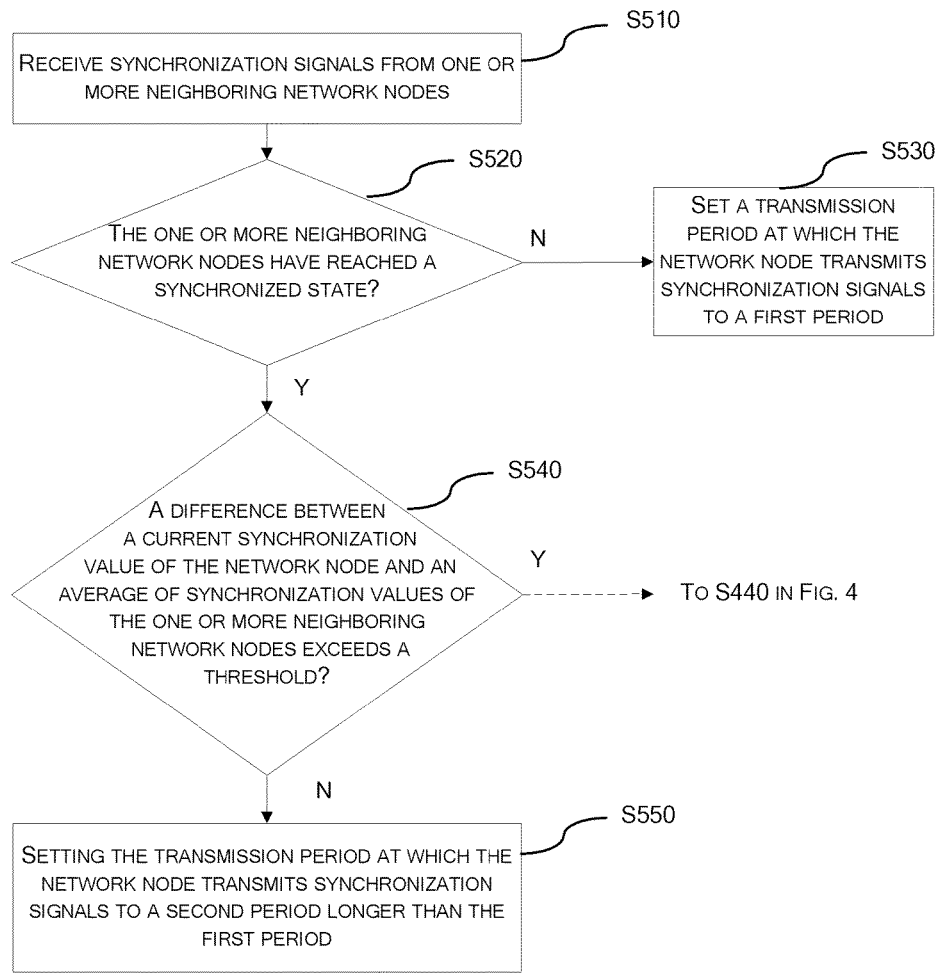
FIG. 5 is a flowchart illustrating a method for facilitating synchronization in a network according to a second embodiment of the present disclosure.

FIG. 5 is a flowchart illustrating a method 500 for facilitating synchronization in a network according to a second embodiment of the present disclosure. Like the method 400, the method 500 can be applied in a UDN consisting of a number of network nodes (e.g., eNBs) and can be performed at a network node (e.g., eNB). It is to be noted here that the application of the method 500 is not limited to the UDN or any specific network or network topology. Rather, it can be applied to any network where synchronization among network nodes is performed in a distributed manner.

The method 500 includes the following steps.

At step S510, synchronization signals are received from one or more neighboring network nodes.

At step S520, it is determined whether the one or more neighboring network nodes have reached a synchronized state based on the synchronization signals.

The determination schemes described above in connection with the step S420 also apply to the step S520. Additionally or alternatively, the determination in the step S520 can be made by determining a period at which each of the one or more neighboring network nodes transmits the synchronization signals. For example, it can be determined that the one or more neighboring network nodes have reached the synchronized state if the period at which each neighboring network node transmits the synchronization signals is shorter than a predefined period. Otherwise, it can be determined that the one or more neighboring network nodes have not reached the synchronized state.

If it is determined in the step S520 that the one or more neighboring network nodes have not reached the synchronized state, the method 500 proceeds with step S530 where a transmission period at which the network node transmits synchronization signals to a first period.

On the other hand, if it is determined in the step S520 that the one or more neighboring network nodes have reached the synchronized state, the method 500 proceeds with step S540 where it is determined whether a difference between a current synchronization value of the network node and the average synchronization value exceeds a threshold.

If it is determined in the step S540 that the difference does not exceed the threshold, the method 500 proceeds with step S550 where the transmission period at which the network node transmits synchronization signals is set to a second period longer than the first period.

According to this embodiment, the transmission period can be set adaptively based on the synchronization state in the network. In other words, when the entire network has reached a synchronized state, i.e., when the neighboring nodes have been synchronized with each other and the network node has been synchronized with the neighboring nodes, the transmission period can be set to a relatively long period for power saving. On the other hand, when the neighboring nodes have not been synchronized with each other, the transmission period can be set to a relatively short period for accelerating the synchronization in the network.

Optionally, the method 500 can be combined with the method 400. In this case, if it is determined in the step S540 that the difference exceeds the threshold, the method 500 may proceed with the step S440 of the method 400.

According to an example, the method 500 may further include a step in which the network node indicates the transmission period, or change thereof (with respect to its previous transmission period), to the one or more neighboring network nodes.

For example, the transmission period, or change thereof, can be indicated by broadcasting a message indicating the transmission period, or change thereof, to the one or more neighboring network nodes, e.g., in Master Information Block (MIB) or System Information Block (SIB). Alternatively, the transmission period, or change thereof, can be indicated by including in each transmitted synchronization signal an information element indicating the transmission period, or change thereof. For example, a 1-bit information element can be used for indicating the transmission period increased by a predefined step with "0" or the transmission period decreased by a predefined step with "1". Alternatively, the transmission period, or change thereof, can be indicated by transmitting a synchronization signal in a predefined format associated with the transmission period. In other words, each format of the synchronization signal can be associated with a transmission period in advance. In this case, the use of a particular format implicitly indicates its associated transmission period.

Figure 6:
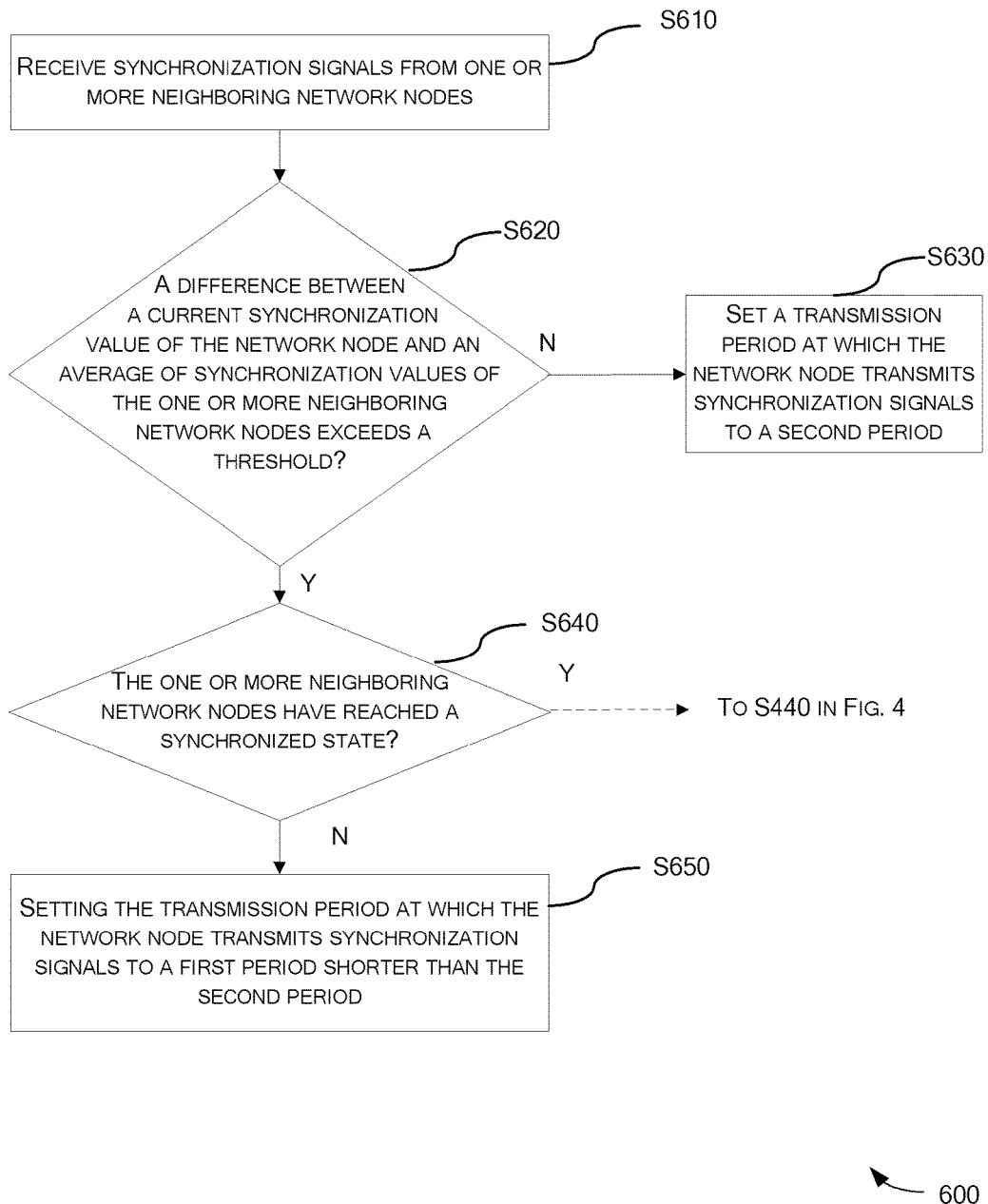
FIG. 6 is a flowchart illustrating a method for facilitating synchronization in a network according to a third embodiment of the present disclosure.

FIG. 6 is a flowchart illustrating a method 600 for facilitating synchronization in a network according to a third embodiment of the present disclosure. Like the methods 400 and 500, the method 600 can be applied in a UDN consisting of a number of network nodes (e.g., eNBs) and can be performed at a network node (e.g., eNB). It is to be noted here that the application of the method 600 is not limited to the UDN or any specific network or network topology. Rather, it can be applied to any network where synchronization among network nodes is performed in a distributed manner.

The method 600 includes the following steps.

At step S610, synchronization signals are received from one or more neighboring network nodes.

At step S620, it is determined whether a difference between a current synchronization value of the network node and the average synchronization value exceeds a threshold.

If it is determined in the step S620 that the difference does not exceed the threshold, the method 600 proceeds with step S630 where a transmission period at which the network node transmits synchronization signals to a second period.

On the other hand, if it is determined in the step S620 that the difference exceeds the threshold, the method 600 proceeds with step S640 where it is determined whether the one or more neighboring network nodes have reached a synchronized state based on the synchronization signals.

If it is determined in the step S640 that the one or more neighboring network nodes have not reached the synchronized state, the method 600 proceeds with step S650 where the transmission period at which the network node transmits synchronization signals is set to a first period shorter than the second period.

The determination schemes described above in connection with the steps S420 and S520 also apply to the step S640 and thus the description thereof will be omitted here.

According to this embodiment, the transmission period can be set adaptively based on the synchronization state in the network. In other words, when the synchronization value of the network node is close to the average synchronization value, the transmission period can be set to a relatively long period for power saving. On the other hand, when the neighboring nodes have not been synchronized with each other and the synchronization value of the network node deviates significantly from the average synchronization value, the transmission period can be set to a relatively short period for accelerating the synchronization in the network.

Optionally, the method 600 can be combined with the method 400. In this case, if it is determined in the step S640 that the one or more neighboring network nodes have reached the synchronized state, the method 600 may proceed with the step S440 of the method 400.

Like the method 500, according to an example, the method 600 may further include a step in which the network node indicates the transmission period, or change thereof (with respect to its previous transmission period), to the one or more neighboring network nodes. The indication schemes described above in connection with the method 500 also apply to the method 600 and thus the description thereof will be omitted here.

As noted above, a "synchronization value" as used herein includes a time-domain synchronization value, a frequency-domain synchronization value or both. When a synchronization value includes both a time-domain synchronization value and a frequency-domain synchronization value, in the step S420, S520 and S640, it is determined that the one or more neighboring network nodes have reached the synchronized state when the one or more neighboring network nodes have reached the synchronized state in both time domain and frequency domain. Also, the threshold in the step S430, S540 and S620 includes a time-domain threshold and a frequency-domain threshold. In this case, it is determined that the difference exceeds the threshold when a difference between the current time-domain synchronization value of the network node and an average of the time-domain synchronization values of the one or more neighboring network nodes exceeds the time-domain threshold, a difference between the current frequency-domain synchronization value of the network node and an average of the frequency-domain synchronization values of the one or more neighboring network nodes exceeds the frequency-domain threshold, or both.

Figure 7:
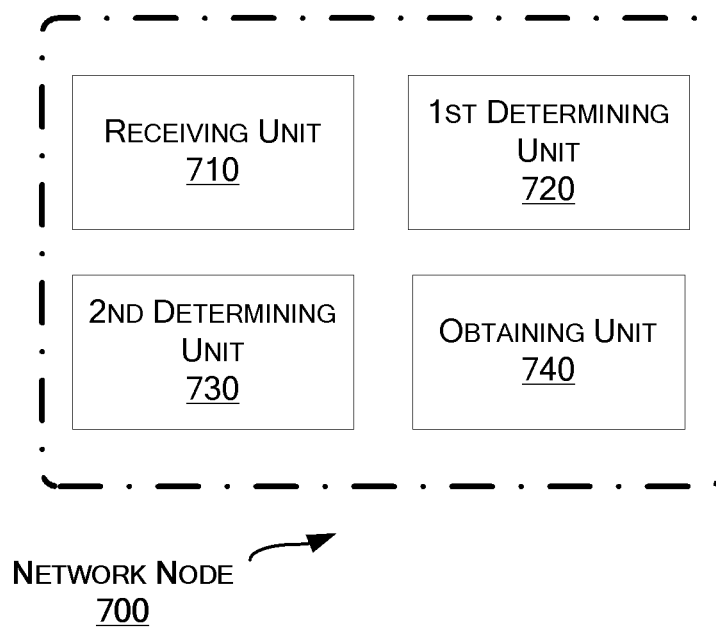
FIG. 7 is a block diagram of a network node for facilitating synchronization in a network according to a first embodiment of the present disclosure.

Correspondingly to the method 400 as described above, a network node for facilitating synchronization in a network is provided. FIG. 7 is a block diagram of a network node 700 for facilitating synchronization in a network according to a first embodiment of the present disclosure. The network node 700 can be a base station (eNB).

As shown in FIG. 7, the network node 700 includes a receiving unit 710 for receiving synchronization signals from one or more neighboring network nodes. The network node 700 further includes a first determining unit 720 for determining whether the one or more neighboring network nodes have reached a synchronized state based on the synchronization signals. The network node 700 further includes a second determining unit 730 for determining whether a difference between a current synchronization value of the network node and an average of synchronization values of the one or more neighboring network nodes exceeds a threshold. The synchronization values are estimated based on the synchronization signals. The network node 700 further includes an obtaining unit 740 for updating and obtaining an updated synchronization value of the network node based on the synchronization values of the one or more neighboring network nodes, regardless of the current synchronization value, when it is determined by the first determining unit that the one or more neighboring network nodes have reached the synchronized state and it is determined by the second determining unit that the difference exceeds the threshold.

In an embodiment, the network 700 may further include a refraining unit (not shown) for refraining from transmitting any synchronization signal when it is determined by the first determining unit 720 that the one or more neighboring network nodes have reached the synchronized state and by the second determining unit 730 that the difference exceeds the threshold. Specifically, the refraining unit would also include a setting unit for setting the transmitting period at which the network node transmits its synchronization signals to its neighboring network nodes. The refraining unit would refrain from transmitting synchronization signal by setting a rather long transmitting period by the setting unit.

In an embodiment, the first determining unit 710 can be configured to determine whether the one or more neighboring network nodes have reached the synchronized state by determining a deviation of each of the synchronization values of the one or more neighboring network nodes from the average.

In an embodiment, the first determining unit 710 can be configured to determine whether the one or more neighboring network nodes have reached the synchronized state by determining a variation of each of the synchronization values of the one or more neighboring network nodes over time.

Each of the units 710-740 can be implemented as a pure hardware solution or as a combination of software and hardware, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 4.

Figure 8:
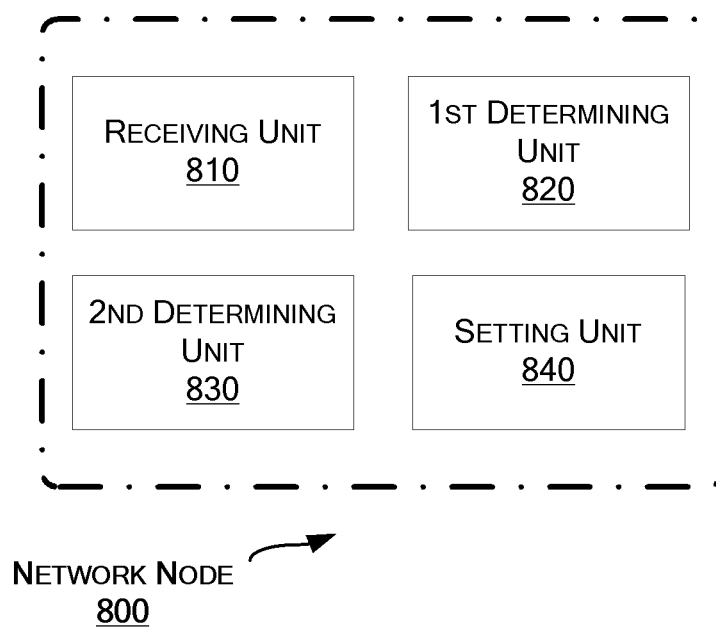
FIG. 8 is a block diagram of a network node for facilitating synchronization in a network according to a second embodiment of the present disclosure.

Correspondingly to the method 500 as described above, a network node for facilitating synchronization in a network is provided. FIG. 8 is a block diagram of a network node 800 for facilitating synchronization in a network according to a second embodiment of the present disclosure. The network node 800 can be a base station (eNB).

As shown in FIG. 8, the network node 800 includes a receiving unit 810, a first determining unit 820 and a second determining unit 830. The receiving unit 810, the first determining unit 820 and the second determining unit 830 have substantially the same functions as the receiving unit 710, the first determining unit 720 and the second determining unit 730 as described above in connection with FIG. 7, respectively, except that the first determining unit 820 can be alternatively or additionally configured to determine whether the one or more neighboring network nodes have reached the synchronized state by determining a deviation of each of the synchronization values of the one or more neighboring network nodes from the average synchronization value.

The network node 800 further includes a setting unit 840 for setting a transmission period at which the network node transmits synchronization signals to a first period when it is determined by the first determining unit 820 that the one or more neighboring network nodes have not reached the synchronized state and setting the transmission period at which the network node transmits synchronization signals to a second period longer than the first period when it is determined by the first determining unit 820 that the one or more neighboring network nodes have reached the synchronized state and it is determined by the second determining unit 830 that the difference does not exceed the threshold.

In an embodiment, the network node 800 may further include an obtaining unit (not shown) for updating and obtaining an updated synchronization value of the network node based on the synchronization values of the one or more neighboring network nodes, regardless of the current synchronization value, when it is determined by the first determining unit 820 that the one or more neighboring network nodes have reached the synchronized state and it is determined by the second determining unit 830 that the difference exceeds the threshold.

In an embodiment, the network node 800 may further include a transmitting unit (not shown) for indicating the transmission period, or change thereof, to the one or more neighboring network nodes.

In an embodiment, the transmitting unit can be configured to indicate the transmission period, or change thereof, by broadcasting a message indicating the transmission period, or change thereof, to the one or more neighboring network nodes. Alternatively, the transmitting unit can be configured to indicate the transmission period, or change thereof, by including in each transmitted synchronization signal an information element indicating the transmission period, or change thereof. Alternatively, the transmitting unit can be configured to indicate the transmission period, or change thereof, by transmitting a synchronization signal in a predefined format associated with the transmission period.

Each of the units 810-840 can be implemented as a pure hardware solution or as a combination of software and hardware, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 5.

Figure 9:
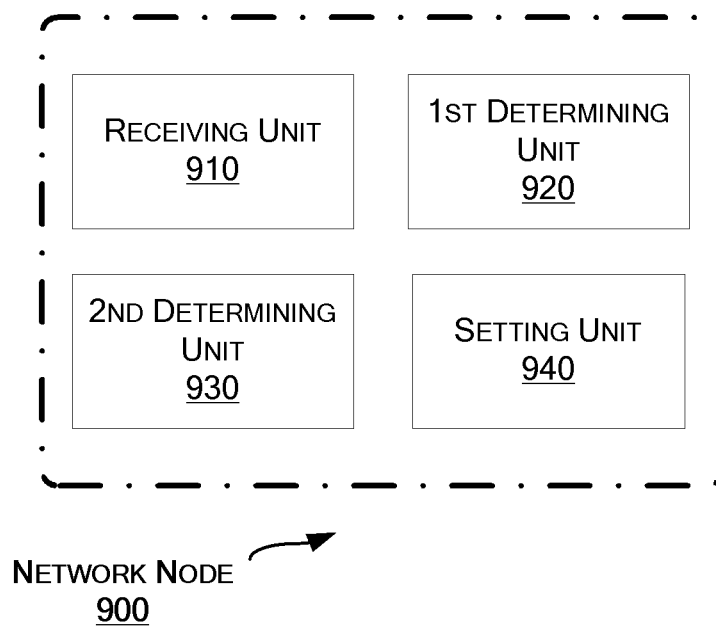
FIG. 9 is a block diagram of a network node for facilitating synchronization in a network according to a third embodiment of the present disclosure.

Correspondingly to the method 600 as described above, a network node for facilitating synchronization in a network is provided. FIG. 9 is a block diagram of a network node 900 for facilitating synchronization in a network according to a second embodiment of the present disclosure. The network node 900 can be a base station (eNB).

As shown in FIG. 9, the network node 900 includes a receiving unit 910, a first determining unit 920 and a second determining unit 930. The receiving unit 910, the first determining unit 920 and the second determining unit 930 have substantially the same functions as the receiving unit 810, the first determining unit 820 and the second determining unit 830 as described above in connection with FIG. 8, respectively and thus the description thereof will be omitted here.

The network node 900 further includes a setting unit 940 for setting the transmission period at which the network node transmits synchronization signals to a second period when it is determined by the second determining unit 930 that the difference does not exceed the threshold; and setting a transmission period at which the network node transmits synchronization signals to a first period shorter than the second period when it is determined by the second determining unit 930 that the difference exceeds the threshold and it is determined by the first determining unit 920 that the one or more neighboring network nodes have not reached the synchronized state.

In an embodiment, the network node 900 may further include an updating and obtaining unit (not shown) for obtaining an updated synchronization value of the network node based on the synchronization values of the one or more neighboring network nodes, regardless of the current synchronization value, when it is determined by the first determining unit 920 that the one or more neighboring network nodes have reached the synchronized state and it is determined by the second determining unit 930 that the difference exceeds the threshold.

In an embodiment, the network node 900 may further include a transmitting unit (not shown). The transmitting unit included in the network node 900 has substantially the same function as the transmitting unit included in the network node 900 and thus the description thereof will be omitted here.

Each of the units 910-940 can be implemented as a pure hardware solution or as a combination of software and hardware, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 6.

As noted above, a "synchronization value" as used herein includes a time-domain synchronization value, a frequency-domain synchronization value or both. When a synchronization value includes both a time-domain synchronization value and a frequency-domain synchronization value, the first determining unit 720, 820 or 920 is configured to determine that the one or more neighboring network nodes have reached the synchronized state when the one or more neighboring network nodes have reached the synchronized state in both time domain and frequency domain. Also, the threshold used in the second determining unit 730, 830 or 930 includes a time-domain threshold and a frequency-domain threshold. In this case, the second determining unit 730, 830 or 930 is configured to determine that the difference exceeds the threshold when a difference between the current time-domain synchronization value of the network node and an average of the time-domain synchronization values of the one or more neighboring network nodes exceeds the time-domain threshold, a difference between the current frequency-domain synchronization value of the network node and an average of the frequency-domain synchronization values of the one or more neighboring network nodes exceeds the frequency-domain threshold, or both.

Figure 10:
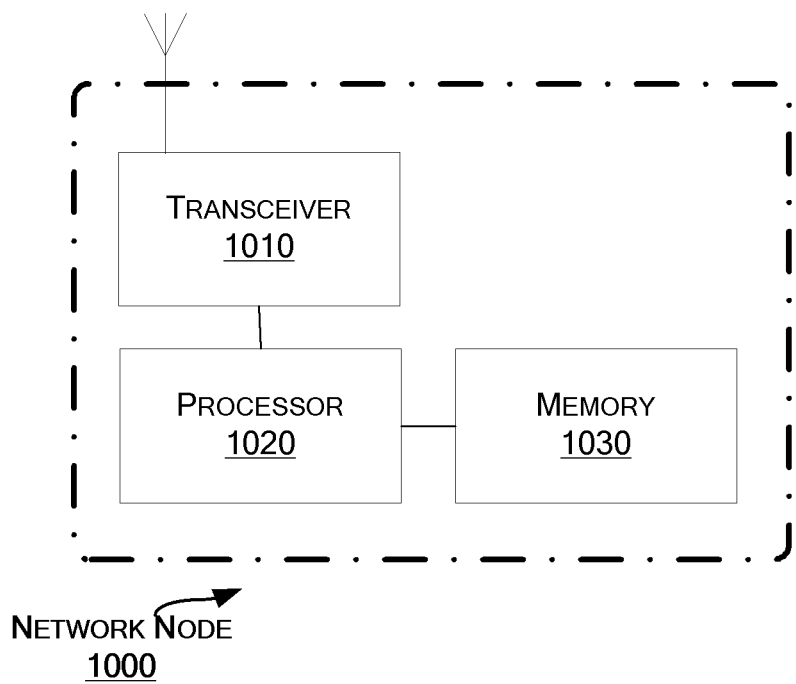
FIG. 10 is a block diagram of a network node for facilitating synchronization in a network according to another embodiment of the present disclosure.

FIG. 10 is a block diagram of a network node 1000 for facilitating synchronization in a network according to another embodiment of the present disclosure.

The network node 1000 includes a transceiver 1010, a processor 1020 and a memory 1030. The memory 1030 contains instructions executable by the processor 1020 whereby the network node 1000 is operative to: receive synchronization signals from one or more neighboring network nodes; determine whether the one or more neighboring network nodes have reached a synchronized state based on the synchronization signals; determine whether a difference between a current synchronization value of the network node and an average of synchronization values of the one or more neighboring network nodes exceeds a threshold, the synchronization values being estimated based on the synchronization signals; and obtain an updated synchronization value of the network node based on the synchronization values of the one or more neighboring network nodes, regardless of the current synchronization value, when it is determined that the one or more neighboring network nodes have reached the synchronized state and the difference exceeds the threshold.

Alternatively, the memory 1030 contains instructions executable by the processor 1020 whereby the network node 1000 is operative to: receive synchronization signals from one or more neighboring network nodes; determine whether the one or more neighboring network nodes have reached a synchronized state based on the synchronization signals; determine whether a difference between a current synchronization value of the network node and an average of synchronization values of the one or more neighboring network nodes exceeds a threshold, the synchronization values being estimated based on the synchronization signals; set a transmission period at which the network node transmits synchronization signals to a first period when it is determined that the one or more neighboring network nodes have not reached the synchronized state; and set the transmission period at which the network node transmits synchronization signals to a second period longer than the first period when it is determined that the one or more neighboring network nodes have reached the synchronized state and that the difference does not exceed the threshold.

Alternatively, the memory 1030 contains instructions executable by the processor 1020 whereby the network node 1000 is operative to: receive synchronization signals from one or more neighboring network nodes; determine whether a difference between a current synchronization value of the network node and an average of synchronization values of the one or more neighboring network nodes exceeds a threshold, the synchronization values being estimated based on the synchronization signals; determine whether the one or more neighboring network nodes have reached a synchronized state based on the synchronization signals; set the transmission period at which the network node transmits synchronization signals to a second period when it is determined that the difference does not exceed the threshold; and set a transmission period at which the network node transmits synchronization signals to a first period shorter than the second period when it is determined that the difference exceeds the threshold and that the one or more neighboring network nodes have not reached the synchronized state.

The present disclosure also provides at least one computer program product in the form of a non-volatile or volatile memory, e.g., an Electrically Erasable Programmable Read-Only Memory (EEPROM), a flash memory and a hard drive. The computer program product includes a computer program. The computer program includes: code/computer readable instructions, which when executed by the processor 1020 causes the network node 1000 to perform the actions, e.g., of the procedure described earlier in conjunction with FIG. 4, 5 or 6.

The computer program product may be configured as a computer program code structured in computer program modules. The computer program modules could essentially perform the actions of the flow illustrated in FIG. 4, 5 or 6.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method for facilitating synchronization in a network, the method comprising, at a network node:
   receiving synchronization signals from one or more neighboring network nodes;
   determining whether the one or more neighboring network nodes have reached a synchronized state based on the synchronization signals;
   determining whether a difference between a current synchronization value of the network node and an average of synchronization values of the one or more neighboring network nodes exceeds a threshold, the synchronization values being estimated based on the synchronization signals; and
   obtaining an updated synchronization value of the network node based on the synchronization values of the one or more neighboring network nodes, regardless of the current synchronization value, in response to a determination that the one or more neighboring network nodes have reached the synchronized state and the difference exceeds the threshold.

2. The method of claim 1, further comprising:
   refraining from transmitting any synchronization signal in response to the determination that the one or more neighboring network nodes have reached the synchronized state and the difference exceeds the threshold.

3. The method of claim 1,
   wherein each synchronization value comprises a time-domain synchronization value and a frequency-domain synchronization value, and
   wherein it is determined that the one or more neighboring network nodes have reached the synchronized state when the one or more neighboring network nodes have reached the synchronized state in both time domain and frequency domain, and
   wherein the threshold comprises a time-domain threshold and a frequency-domain threshold and it is determined that the difference exceeds the threshold when a difference between the current time-domain synchronization value of the network node and an average of the time-domain synchronization values of the one or more neighboring network nodes exceeds the time-domain threshold, a difference between the current frequency-domain synchronization value of the network node and an average of the frequency-domain synchronization values of the one or more neighboring network nodes exceeds the frequency-domain threshold, or both.

4. A method for facilitating synchronization in a network, the method comprising, at a network node:
   receiving synchronization signals from one or more neighboring network nodes;
   determining whether the one or more neighboring network nodes have reached a synchronized state based on the synchronization signals;
   determining whether a difference between a current synchronization value of the network node and an average of synchronization values of the one or more neighboring network nodes exceeds a threshold, the synchronization values being estimated based on the synchronization signals;

setting a transmission period at which the network node transmits synchronization signals according to whether in response to a determination that the one or more neighboring network nodes has reached synchronized state, and/or the difference between the synchronization values exceed the threshold.

5. The method of claim 4, further comprising:
obtaining an updated synchronization value of the network node based on the synchronization values of the one or more neighboring network nodes, regardless of the current synchronization value, in response to determinations that the one or more neighboring network nodes have reached the synchronized state and the difference exceeds the threshold.

6. The method of claim 4, further comprising:
indicating the transmission period, or a change thereof, to the one or more neighboring network nodes.

7. The method of claim 6, wherein the transmission period or change thereof is indicated by:
broadcasting a message indicating the transmission period, or change thereof, to the one or more neighboring network nodes;
including in each transmitted synchronization signal an information element indicating the transmission period or change thereof, or
transmitting a synchronization signal in a predefined format associated with the transmission period.

8. The method of claim 4, wherein setting the transmission period comprises:
setting the transmission period to a first period when it is determined that the one or more neighboring network nodes have not reached the synchronized state; and
setting the transmission period to a second period longer than the first period when it is determined that the one or more neighboring network nodes have reached the synchronized state and that the difference does not exceed the threshold.

9. The method of claim 4, wherein setting the transmission period comprises:
setting the transmission period at which the network node transmits synchronization signals to a second period when it is determined that the difference does not exceed the threshold; and
setting the transmission period to a first period shorter than the second period when it is determined that the difference exceeds the threshold and that the one or more neighboring network nodes have not reached the synchronized state.

10. The method of claim 4, wherein it is determined whether the one or more neighboring network nodes have reached the synchronized state by:
determining a period at which each of the one or more neighboring network nodes transmits the synchronization signals;
determining a deviation of each of the synchronization values of the one or more neighboring network nodes from the average; or
determining a variation of each of the synchronization values of the one or more neighboring network nodes over time.

11. The method of claim 4, wherein each synchronization value comprises a time-domain synchronization value or a frequency-domain synchronization value.

12. The method of claim 4,
wherein each synchronization value comprises a time-domain synchronization value and a frequency-domain synchronization value, and
wherein it is determined that the one or more neighboring network nodes have reached the synchronized state when the one or more neighboring network nodes have reached the synchronized state in both time domain and frequency domain, and
wherein the threshold comprises a time-domain threshold and a frequency-domain threshold and it is determined that the difference exceeds the threshold when a difference between the current time-domain synchronization value of the network node and an average of the time-domain synchronization values of the one or more neighboring network nodes exceeds the time-domain threshold, a difference between the current frequency-domain synchronization value of the network node and an average of the frequency-domain synchronization values of the one or more neighboring network nodes exceeds the frequency-domain threshold, or both.

13. A network node for facilitating synchronization in a network comprises a transceiver, a processor and a memory, wherein the memory contains instructions executable by the processor whereby the network node is operative to:
receive synchronization signals from one or more neighboring network nodes;
determine whether the one or more neighboring network nodes have reached a synchronized state based on the synchronization signals;
determine whether a difference between a current synchronization value of the network node and an average of synchronization values of the one or more neighboring network nodes exceeds a threshold, the synchronization values being estimated based on the synchronization signals;
set a transmission period at which the network node transmits synchronization signals according to whether in response to a determination that the one or more neighboring network nodes has reached synchronized state, and/or the difference between the synchronization values exceed the threshold.

14. The network node of claim 13, wherein the instructions are such that the network node is further operative to:
obtain an updated synchronization value of the network node based on the synchronization values of the one or more neighboring network nodes, regardless of the current synchronization value, in response to a determination that the one or more neighboring network nodes have reached the synchronized state and the difference exceeds the threshold.

15. The network node of claim 13, wherein the instructions are such that the network node is further operative to:
indicate the transmission period, or change thereof, to the one or more neighboring network nodes.

16. The network node of claim 15, wherein the instructions are such that the network node is further operative to:
broadcast a message indicating the transmission period, or change thereof, to the one or more neighboring network nodes;
include in each transmitted synchronization signal an information element indicating the transmission period, or change thereof, or
transmit a synchronization signal in a predefined format associated with the transmission period.

17. The network node of claim 13, wherein the instructions are such that the network node is further operative to:

set the transmission period to a first period when it is determined that the one or more neighboring network nodes have not reached the synchronized state; and set the transmission period to a second period longer than the first period when it is determined that the one or more neighboring network nodes have reached the synchronized state and that the difference does not exceed the threshold.

18. The network node of claim 13, wherein the instructions are such that the network node is further operative to:

set the transmission period at which the network node transmits synchronization signals to a second period when it is determined that the difference does not exceed the threshold; and set the transmission period to a first period shorter than the second period when it is determined that the difference exceeds the threshold and that the one or more neighboring network nodes have not reached the synchronized state.

19. The network node of claim 13, wherein the instructions are such that the network node is further operative to:

determine a period at which each of the one or more neighboring network nodes transmits the synchronization signals;

determine a deviation of each of the synchronization values of the one or more neighboring network nodes from the average; or determine a variation of each of the synchronization values of the one or more neighboring network nodes over time.

20. The network node of claim 13, wherein each synchronization value comprises a time-domain synchronization value or a frequency-domain synchronization value.

* * * * *